US007051315B2

(12) United States Patent
Artzi et al.

(10) Patent No.: US 7,051,315 B2
(45) Date of Patent: *May 23, 2006

(54) NETWORK STREAMING OF MULTI-APPLICATION PROGRAM CODE

(75) Inventors: Itzik Artzi, San Ramon, CA (US); Bridget McDermott, Mountain View, CA (US); Dan Eylon, Ramat Hasharon (IL); Amit Ramon, Zoran (IL); Yehuda Volk, Tel-Aviv (IL)

(73) Assignee: AppStream, Inc., Palo Alto, CA (US)

( * ) Notice: Subject to any disclaimer, the term of this patent is extended or adjusted under 35 U.S.C. 154(b) by 965 days.

This patent is subject to a terminal disclaimer.

(21) Appl. No.: 09/751,781

(22) Filed: Dec. 30, 2000

(65) Prior Publication Data

US 2002/0087717 A1 Jul. 4, 2002

Related U.S. Application Data

(63) Continuation-in-part of application No. 09/750,836, filed on Dec. 28, 2000, now Pat. No. 6,757,894.

(60) Provisional application No. 60/235,535, filed on Sep. 26, 2000.

(51) Int. Cl.
*G06F 9/44* (2006.01)

(52) U.S. Cl. ............... 717/103; 717/172; 717/177; 709/201; 709/203; 709/231

(58) Field of Classification Search ........ 717/103–104, 717/106–107, 175–178, 171, 172; 711/103, 711/112, 133; 713/1–2; 709/201, 220, 231, 709/330, 203

See application file for complete search history.

(56) References Cited

U.S. PATENT DOCUMENTS

| 5,163,131 | A |   | 11/1992 | Row et al. ................ 395/200 |
| 5,237,460 | A |   | 8/1993  | Miller et al. |
| 5,394,534 | A | * | 2/1995  | Kulakowski et al. ....... 711/112 |
| 5,487,167 | A |   | 1/1996  | Dinallo et al. ............. 395/650 |
| 5,504,886 | A |   | 4/1996  | Chang et al. ............... 395/600 |
| 5,581,706 | A |   | 12/1996 | Jessup, Jr. et al. .......... 395/200 |

(Continued)

FOREIGN PATENT DOCUMENTS

WO   WO/97/46955   12/1997

(Continued)

OTHER PUBLICATIONS

Microsoft Prin Computer Dictionary, Third Edition, published on 1997.*

(Continued)

*Primary Examiner*—Chameli C. Das
(74) *Attorney, Agent, or Firm*—Blakely, Sokoloff, Taylor & Zafman LLP

(57) ABSTRACT

Executable software sent from an application service provider to a client computer can be arranged as a bundle of executable code blocks that are used during initialization of a group of applications (at least one initialization block from each application being included in the bundle). The bundle can include code for applications that are subscribed to by a user as well as for applications not subscribed to. As the subscribed applications are executed, usage data sent to a server may be monitored to determine unsubscribed applications that may be of interest to the user. Subscription offers may be automatically generated and sent to the user in response to processing of the usage data. Transmission efficiency of the code blocks may be improved by exchanging identification codes between the server and client to determine code blocks already present at the client.

18 Claims, 7 Drawing Sheets

U.S. PATENT DOCUMENTS

| | | | | |
|---|---|---|---|---|
| 5,581,764 | A | 12/1996 | Fitzgerald et al. | 395/703 |
| 5,708,796 | A | 1/1998 | Ozden et al. | 395/494 |
| 5,712,976 | A | 1/1998 | Falcon, Jr. et al. | 395/200 |
| 5,742,768 | A | 4/1998 | Gennaro et al. | 295/200 |
| 5,745,380 | A | 4/1998 | Sandvoss et al. | 364/514 |
| 5,754,774 | A | 5/1998 | Bittinger et al. | 395/200 |
| 5,761,477 | A | 6/1998 | Wahbe et al. | 395/406 |
| 5,764,235 | A | 6/1998 | Hunt et al. | 345/428 |
| 5,765,164 | A | 6/1998 | Prasad et al. | 707/104 |
| 5,768,528 | A | 6/1998 | Stumm | |
| 5,787,284 | A | 7/1998 | Blainey et al. | 395/701 |
| 5,802,292 | A | 9/1998 | Mogul | 395/200 |
| 5,835,749 | A | 11/1998 | Cobb | 395/500 |
| 5,864,870 | A | 1/1999 | Guck | |
| 5,878,223 | A | 3/1999 | Becker et al. | 395/200 |
| 5,892,915 | A | 4/1999 | Duso et al. | |
| 5,894,479 | A * | 4/1999 | Mohammed | 370/401 |
| 5,911,776 | A | 6/1999 | Guck | |
| 5,919,247 | A | 7/1999 | Van Hoff et al. | 709/217 |
| 5,933,644 | A | 8/1999 | Wallace | 395/709 |
| 5,946,697 | A * | 8/1999 | Shen | 715/513 |
| 5,956,485 | A | 9/1999 | Perlman | |
| 5,956,509 | A * | 9/1999 | Kevner | 719/330 |
| 5,958,051 | A | 9/1999 | Renaud et al. | |
| 5,966,702 | A | 10/1999 | Fresko et al. | |
| 5,974,129 | A | 10/1999 | Bodnar | 379/207 |
| 5,978,788 | A | 11/1999 | Castelli et al. | 707/2 |
| 5,978,791 | A | 11/1999 | Farber et al. | 707/2 |
| 5,987,513 | A | 11/1999 | Prithviraj et al. | |
| 5,991,776 | A | 11/1999 | Bennett et al. | |
| 6,003,087 | A | 12/1999 | Housel, III et al. | 709/229 |
| 6,006,265 | A | 12/1999 | Rangan et al. | |
| 6,009,410 | A | 12/1999 | LeMole et al. | 705/14 |
| 6,012,071 | A | 1/2000 | Krishna et al. | |
| 6,023,726 | A * | 2/2000 | Saksena | 709/219 |
| 6,029,045 | A | 2/2000 | Picco et al. | |
| 6,044,382 | A | 3/2000 | Martino | |
| 6,044,403 | A | 3/2000 | Gerszberg et al. | |
| 6,047,323 | A | 4/2000 | Krause | 709/227 |
| 6,058,387 | A | 5/2000 | Campbell et al. | |
| 6,065,046 | A * | 5/2000 | Feinberg et al. | 709/216 |
| 6,073,129 | A | 6/2000 | Levine et al. | 707/4 |
| 6,085,193 | A | 7/2000 | Malkin et al. | |
| 6,088,524 | A | 7/2000 | Levy et al. | 395/603 |
| 6,101,495 | A | 8/2000 | Tsuchida et al. | 707/4 |
| 6,102,287 | A | 8/2000 | Matyas, Jr. | |
| 6,108,703 | A | 8/2000 | Leighton et al. | 709/226 |
| 6,119,082 | A | 9/2000 | Zinser, Jr. et al. | |
| 6,122,628 | A | 9/2000 | Castelli et al. | 707/5 |
| 6,128,653 | A | 10/2000 | del Val et al. | |
| 6,139,197 | A | 10/2000 | Banks | |
| 6,148,340 | A | 11/2000 | Bittinger et al. | |
| 6,163,805 | A | 12/2000 | Silva et al. | |
| 6,170,008 | B1 * | 1/2001 | Bahlmann et al. | 709/220 |
| 6,173,291 | B1 | 1/2001 | Jenevein | |
| 6,199,082 | B1 | 3/2001 | Ferrel et al. | |
| 6,199,095 | B1 | 3/2001 | Robinson | |
| 6,205,481 | B1 | 3/2001 | Heddaya et al. | |
| 6,219,671 | B1 | 4/2001 | de Vries et al. | |
| 6,230,184 | B1 | 5/2001 | White et al. | |
| 6,256,623 | B1 | 7/2001 | Jones | |
| 6,272,598 | B1 | 8/2001 | Arlitt et al. | |
| 6,282,711 | B1 | 8/2001 | Halpern et al. | |
| 6,289,334 | B1 | 9/2001 | Reiner et al. | |
| 6,311,221 | B1 | 10/2001 | Raz et al. | |
| 6,357,042 | B1 | 3/2002 | Srinivasan et al. | |
| 6,370,573 | B1 | 4/2002 | Bowman-Amuah | |
| 6,374,402 | B1 | 4/2002 | Schmeidler et al. | |
| 6,381,742 | B1 | 4/2002 | Forbes et al. | |
| 6,385,644 | B1 | 5/2002 | Devine et al. | |
| 6,393,526 | B1 | 5/2002 | Crow et al. | |
| 6,408,294 | B1 | 6/2002 | Getchius et al. | |
| 6,412,004 | B1 | 6/2002 | Chen et al. | |
| 6,421,777 | B1 * | 7/2002 | Pierre-Louis et al. | 713/2 |
| 6,425,125 | B1 | 7/2002 | Fries et al. | |
| 6,427,149 | B1 | 7/2002 | Rodriguez et al. | |
| 6,438,630 | B1 | 8/2002 | DeMoney | |
| 6,453,334 | B1 | 9/2002 | Vinson et al. | |
| 6,453,354 | B1 | 9/2002 | Jiang et al. | |
| 6,463,508 | B1 * | 10/2002 | Wolf et al. | 711/133 |
| 6,466,980 | B1 | 10/2002 | Lumelsky et al. | |
| 6,484,311 | B1 | 11/2002 | Sobeski et al. | |
| 6,493,434 | B1 | 12/2002 | Desmond et al. | |
| 6,499,060 | B1 | 12/2002 | Wang et al. | |
| 6,523,027 | B1 | 2/2003 | Underwood | |
| 6,535,894 | B1 | 3/2003 | Schmidt et al. | |
| 6,538,991 | B1 | 3/2003 | Kodialam et al. | |
| 6,574,618 | B1 | 6/2003 | Eylon et al. | |
| 6,587,127 | B1 | 7/2003 | Leeke et al. | |
| 6,604,106 | B1 | 8/2003 | Bodin et al. | |
| 6,615,258 | B1 | 9/2003 | Barry et al. | |
| 6,622,168 | B1 | 9/2003 | Datta | |
| 6,622,199 | B1 * | 9/2003 | Spall et al. | 711/103 |
| 6,625,581 | B1 | 9/2003 | Perkowski | |
| 6,633,898 | B1 * | 10/2003 | Seguchi et al. | 709/201 |
| 6,643,650 | B1 | 11/2003 | Slaughter et al. | |
| 6,748,525 | B1 * | 6/2004 | Hubacher et al. | 713/1 |
| 6,757,894 | B1 | 6/2004 | Eylon et al. | |
| 6,763,370 | B1 | 7/2004 | Schmeidler et al. | |
| 6,789,252 | B1 * | 9/2004 | Burke et al. | 717/100 |
| 6,799,197 | B1 * | 9/2004 | Shetty et al. | 709/203 |
| 6,810,478 | B1 * | 10/2004 | Anand et al. | 713/2 |
| 6,839,765 | B1 * | 1/2005 | Sato | 709/231 |
| 6,845,098 | B1 * | 1/2005 | Strahs | 370/352 |
| 2001/0034736 | A1 | 10/2001 | Eylon et al. | |
| 2001/0037399 | A1 | 11/2001 | Eylon et al. | |
| 2001/0037400 | A1 | 11/2001 | Raz et al. | |
| 2001/0044850 | A1 | 11/2001 | Raz et al. | |
| 2002/0009538 | A1 | 1/2002 | Arai | |
| 2002/0042833 | A1 | 4/2002 | Hendler et al. | |
| 2002/0083183 | A1 | 6/2002 | Pujare et al. | |
| 2002/0087883 | A1 | 7/2002 | Wohlgemuth et al. | |
| 2002/0087963 | A1 | 7/2002 | Eylon et al. | |
| 2002/0091763 | A1 | 7/2002 | Shah et al. | |
| 2002/0138640 | A1 | 9/2002 | Raz et al. | |
| 2002/0157089 | A1 | 10/2002 | Patel et al. | |
| 2002/0161908 | A1 | 10/2002 | Benitez et al. | |
| 2003/0004882 | A1 | 1/2003 | Holler et al. | |
| 2003/0009538 | A1 | 1/2003 | Shah et al. | |
| 2003/0056112 | A1 | 3/2003 | Vinson et al. | |
| 2003/0140160 | A1 | 7/2003 | Raz et al. | |
| 2004/0165007 | A1 | 8/2004 | Shafron | |

FOREIGN PATENT DOCUMENTS

| | | |
|---|---|---|
| WO | WO 99/07007 A2 | 2/1999 |
| WO | PCT/US99/16055 | 7/1999 |
| WO | PCT/US00/02190 | 6/2000 |
| WO | WO/00/46685 | 8/2000 |
| WO | WO 00/62161 | 10/2000 |

OTHER PUBLICATIONS

TITLE: Delivering presentations from multimedia servers, author: Bulkir et al, ACM, 1998.*

TITLE: Client Server Computing, author: Sinha, ACM, 1992.*

G. Glass, "A Universal Streaming Service", C + + Report, Apr. 1996, pp. 74-83.

T. Ritchey, "Java!", New Riders Publishing, 1995, pp. 214-216.

Chen et al., "Real-Time Video and Audio in the World Wide Web" World Wide Web Journal, Dec. 11-14, 1995, pp. 333-348.

Jiang et al., "Prefetching Links on the WWW", Department of Computer Science University of California, 1997, pp. 483-489.

M. Schwartz, "Telecommunication Networks: Protocols, Modeling and Analysis", Addison-Wesley Publishing Company, pp. 266-283.

J. Basu et al., "Degrees of Transaction Isolation in SQL *Cache: A Predicate-based Client-side Caching System", May 15, 1996, pp. 1-22.

S. Shepler, "NFS Version 4 Design Considerations", internet site WWW.ietf.org, Jun. 1999, pp. 1-19.

Amit Shukla et al., "Storage Estimation for Multidimensional Aggregates in the Presence of Hierarchies", VLDB Conference Mumbai (Bombay), 1996, pp. 522-531.

Dale Skeen, "New Forms Of Persistent Queries Are Necessary To Handle Live Business Data As It Speeds Through A Company", internet website www.byte.com BYTE Magazine, Feb. 1998, pp. 1-5, 1-2, 1-2.

E. Markatos, "On Caching Search Engine Query Results", internet website www.ii.uib.no, Oct. 5, 2000, pp. 1-14.

"WTE Programming Guide", internet website ww.4.ibm.com, Oct. 5, 2000, pp. 1-40.

J. Song et al., "Design Alternatives for Scalable Web Server Accelerators", IBM T.J. Watson Research Center, pp. 1-20.

V. Hoff et al., "The Open Software Description Format (OSD)", internet website www.w3.org, Aug. 11, 1997, pp. 1-13.

Red Brick Vista, "Aggregate Computation and Management", internet website www.informix.com, Oct. 4, 2000.

Fireclick, "Web Site Performance is Key to E-Commerce Success", internet website WWW.Fireclick.com, Nov. 1, 2000.

Boost Web Optimizer Technology Overview, "How it Works", Sep. 27, 2000.

"Delivering Windows to the Net White Paper", Menta Software, 2000.

"First There was Streaming Audio, then Streaming Video. Now get ready for Streaming Software", Stream Theory, 2000.

"OSD Describing Software Packages on the Internet", internet website www.marimba.com, 1998.

"Understanding Centralized Management of Server Content and Applications", Marimba, 2000, pp. 1-16.

"Timbale for Windows Terminal Services", Marimba.

International Search Report for PCT/US01/30006 dated Dec. 4, 2001.

International Search Report for PCT/US01/30007 dated Dec. 13, 2001.

Cuneyt Akinlar et al., "A Scalable Distributed Multimedia File System Using Network Attached Autonomous Disks", 2000, pp. 180-187, IEEE.

S.-H. Gary Chan et al., "Caching Schemes for Distributed Video Services", 1999, pp. 994-999, IEEE, Stanford, California.

"Connected Limited Device Configuration", Java 2 Platform Micro Edition, May 19, 2000, pp. 1-56, Specification Version 1.0, Sun Microsystems, Palo Alto, California.

*Distributed Systems Concepts and Designs, Second Edition*, 1994, pp. 1-9, Addison-Wesley Publishers Ltd., United States of America.

Alan Jones et al., "Handling Audio and Video Streams in a Distributed Environment", 1993, pp. 231-243, Cambridge, United Kingdom.

"Java 2 Platform Micro Edition (J2ME) Technology for Creating Mobile Devices, May 19, 2000", pp. 1-42, Sun Microsystems, Inc., Palo Alto, California.

"Java Media Framework API Guide", Nov. 19, 1999, pp. 1-91, JMF 2.0 FCS, Sun Microsystems, Inc., Mountain View, California.

Javed I. Khan, "Ordering Prefetch in Tress, Sequences and Graphs", Technical Report, Dec. 3, 1999, pp. 1-6, Department of Math and Computer Science, Kent State University, Kent Ohio.

"PKZIP Application Note", Nov. 1, 2000, pp. 1-20, Version 4.0.

Zheng Wang et al., "Prefetching in World Wide Web", Nov. 18, 1996, pp. 28-32, IEEE, London, United Kingdom.

International Search Report dated Aug. 6, 2001 for PCT/US01/01501, 4 pgs.

International Search Report dated Oct. 12, 2001 for PCT/US01/01596, 3 pgs.

* cited by examiner

NETWORK STREAMING OF MULTI-APPLICATION PROGRAM CODE

CROSS-REFERENCE(S) TO RELATED APPLICATIONS

The present application is a continuation-in-part of U.S. patent application entitled, "Preprocessed Applications Suitable for Network Streaming Applications and Method for Producing Same," filed on Dec. 28, 2000, and assigned application Ser. No. 09/750,836, which has now issued as U.S. Pat. No. 6,757,894, and which claims the benefit under 35 U.S.C. § 119 of U.S. provisional patent application No. 60/235,535, entitled, "Native Streaming Architecture", filed on Sep. 26, 2000.

FIELD OF THE INVENTION

The present invention is directed to a method and system for preprocessing and packaging application files for use by a network-based streaming application service provider.

BACKGROUND OF THE INVENTION

The Internet, and particularly the world-wide-web, is a rapidly growing network of interconnected computers from which users can access a wide variety of information. Initial widespread use of the Internet was limited to the delivery of static information. A newly developing area of functionality is the delivery and execution of complex software applications via the Internet. There are two basic techniques for software delivery, remote execution and local delivery, e.g., by downloading.

In a remote execution embodiment, a user accesses software which is loaded and executed on a remote server under the control of the user. One simple example is the use of Internet-accessible CGI programs which are executed by Internet servers based on data entered by a client. A more complex systems is the Win-to-Net system provided by Menta Software. This system delivers client software to the user which is used to create a Microsoft Windows style application window on the client machine. The client software interacts with an application program executing on the server and displays a window which corresponds to one which would be shown if the application were installed locally. The client software is further configured to direct certain I/O operations, such as printing a file, to the client's system, to replicate the "feel" of a locally running application. Other remote-access systems, such as provided by Citrix Systems, are accessed through a conventional Internet Browser and present the user with a "remote desktop" generated by a host computer which is used to execute the software.

Because the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection of the proper software components to install and initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

One such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this system is impractical for providing local application services on-demand because of the potentially long time between when the download begins and the software begins local execution.

Recently, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application may be executed in sequences which vary according to user input and other factors.

To address this issue, as well as other deficiencies in prior data streaming and local software delivery systems, an improved technique of delivering applications to a client for local execution has been developed. This technique is described in co-pending U.S. patent application Ser. No. 09/120,575, entitled "Streaming Modules" and filed on Jul. 22, 1998. In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible.

In a newly developed application streaming methodology, described in co-pending U.S. patent application entitled "Method and System for Executing Network Streamed Applications", filed concurrently with the present application, the client system is provided with client-side streaming support software which establishes a virtual file system ("VFS") and connects it to the client's operating system such that the virtual file system appears to be a storage device. The VFS is configured as a sparsely populated file system which appears to the operating system to contain the entire set of application files but, in reality, will typically contain only portions of selected files. Client streaming functionality is provided to process streamlets or blocks of individual files and add them to the VFS as appropriate.

SUMMARY OF THE INVENTION

The present invention is directed to a method and system for preprocessing and packaging application files for use by a network-based streaming application service provider which is configured to stream the software to a client for client-side execution. The application files are divided into sets of streamlets, each of which corresponds to a data block in a particular application file at a particular offset and having a predefined length. Preferably, the data blocks are equal in size to a code page size used during file reads by an operating system expected to be present on a system executing the application. For Microsoft Window's based systems, 4k code pages are used.

Each streamlet is then compressed and the compressed streamlets are packaged into a streamlet repository. While the original boundaries between application files are not preserved in this repository, index data is provided to permit specific streamlets to be retrieved with reference to the source filename and an offset in that file. In addition, an application file structure which indicates how the various files associated with an application appear to a computer when the application is locally installed is determined and this information packaged with the repository. With reference to the application file structure, precompressed streamlets corresponding to specific code pages in a particular application file can be selectively extracted from the streamlet repository.

According to a further aspect of the application preprocessing method, the application is selectively installed on a suitable test machine. Prior to installation, a "snapshot" of the environmental condition of the test machine, such as environmental variable settings, contents of system control files, etc., is taken. This starting condition is compared with the environmental condition after the application has been installed and the environmental changes due to the application installation are determined. This information is recorded in an environmental install package. When the application is streamed to a client, the environmental install package can be used to properly configure the client system during a virtually installation of the streaming application.

After the application has been installed on the test machine (or another machine), the application is started and the sequence in which the various file blocks are loaded are monitored during the application startup process. Those application streamlets which are required to enable execution of the application to be initiated, and preferably those streamlets required to have the application run to a point where user interaction is required are identified. Those identified streamlets form a startup streamlet set which represents a minimal portion of the application which should be present on the client system for the application to begin execution.

According to a further aspect of the invention, in addition to packaging the application into a streamlet repository and identifying environmental install data and a startup streamlet set, the application is executed using test inputs and simulated or real user interaction and the sequence of code and data loads generated by an operating system as it executes the application are monitored. This information is used to generate a predictive model of the order in which the application file blocks are loaded during execution. The predictive model can be used by a streaming application server to determine an optimal order in which to send streamlets to a client to minimize the likelihood that the application will require a portion of an application file before the corresponding streamlet has been sent to the client.

Through use of the new methods, preprocessed application streaming packages can be easily and quickly generated for a variety of applications. The packages can include the streamlet repository, application file structure, environmental install package, startup set definition (or the startup streamlets themselves combined in a cluster), and predictive model. The packages can then easily be provided to one or more streaming application servers.

Advantageously, the streaming application package does not require any modifications to the application code or data itself. Further, because the application files are segmented into streamlets in a manner which is independent of the actual code or data content of the files, a wide variety of application packages can be easily prepared for streaming in this manner. In addition, the application streamlet repository as well as the additional elements of the application package can be formatted and stored in any manner suitable for retrieval on the server system. Thus, the server operating system and data storage environment can be selected without regard for whether it is compatible with the application's environment and the manner in which the application is stored. Finally, precompressing each streamlet prior to delivery to the server decreases the net size of the streamlet repository and increases the overall streaming rate without increasing server load by compression on-the-fly or the time required for the server to extract the streamlets from the repository.

The details of one or more embodiments of the invention are set forth in the accompanying drawings and the description below. Other features, objects, and advantages of the invention will be apparent from the description and drawings, and from the claims.

DESCRIPTION OF THE DRAWINGS

The foregoing and other features of the present invention will be more readily apparent from the following detailed description and drawings of illustrative embodiments of the invention in which.

DETAILED DESCRIPTION OF THE INVENTION

Figure 1:
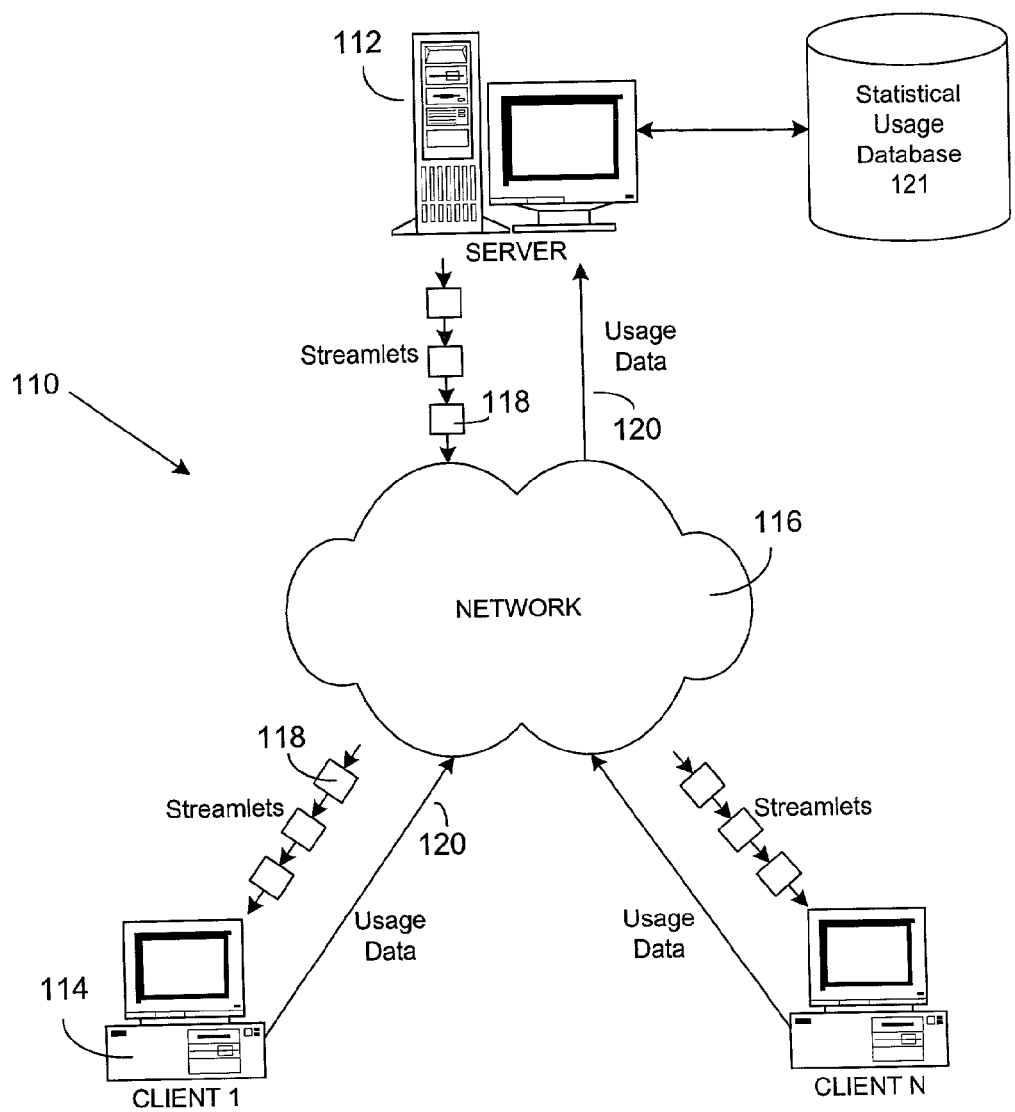
FIG. 1 is a block diagram of an application streaming system.

Turning to FIG. 1, there is shown block diagram of a streaming application system 110, the performance of which can be improved through the use of preprocessed application packages produced in accordance with the present invention. The system includes a server 112 which can be accessed by one or more clients 114 via a data network 116, such as the Internet, an intranet, extranet or other TCP/IP based communication network, or other types of data networks, including wireless data networks.

The server 112 stores a streaming application package for use in streaming a software application to a client on request. As discussed in more detail below, to prepare an application for streaming, the various files used for the application are divided into small segments called streamlets which are then stored, preferably in a compressed form, in a suitable library accessible to the server. In addition, a file structure specification for each hosted application which defines how the various files associated with an application appear to a computer when the application is locally installed is provided on the sever. An application's file structure specification can be packaged in a Startup Block which is sent to a client when streaming of the application begins. The Startup Block can also contain startup streamlet set which includes at least those streamlets containing the portions of the application required to enable execution of the application to be initiated, and preferably those streamlets required to begin application execution and have the application run to a point where user interaction is required. In addition, further application information, such as environmental variable settings, additions to system control files, and other system modifications or additions which may be required to "virtually install" the application can be provided.

Once the startup streamlet set is received and loaded at the client, the client initiates execution of the application. Concurrently, the server continues to push streamlets to the client in accordance with the predictive model. In addition, the server is responsive to fetch requests issued by clients to retrieve specific streamlets which have not yet been delivered. The streamlets can be forwarded to a client individually or grouped together and pushed in clusters as appropriate.

Various embodiments of the client system can be used. In one embodiment, the client system is configured with a virtual file system which appears to the client operating system as a local drive on which all the files needed by the streaming application reside. When a required segment is not present on the client machine, the client issues a request for the appropriate streamlet(s) to the server. Usage information 120 can also be sent from the client 114 to the server 112 and can be used by the server to determine which streamlets to provide next.

Implementations may use a server system as disclosed in U.S. patent application entitled "Method And System For Streaming Software Applications to a Client" and filed concurrently with the present application. Implementations may also use a client system as disclosed in U.S. patent application entitled "Method and System for Executing Network Streamed Applications" and filed concurrently with the present application. The entire contents of these application has been expressly incorporated by reference.

Figure 2:
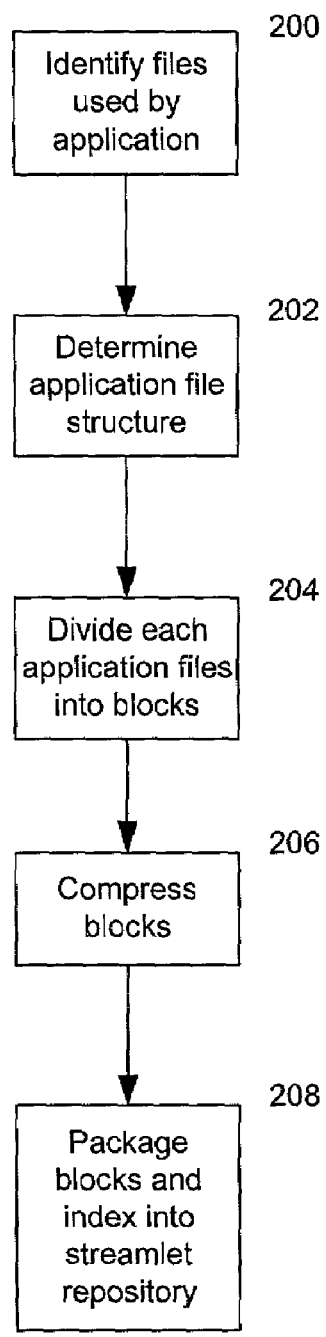
FIG. 2 is a high-level flowchart of a method for packaging a set of application files into a streamlet repository.
Figure 3:
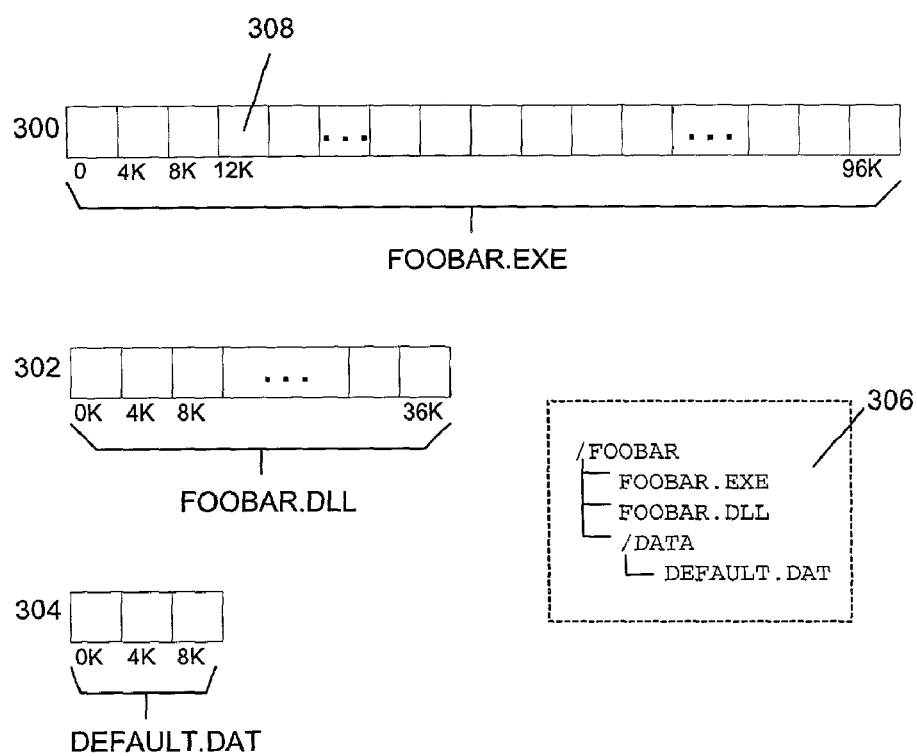
FIG. 3 is an illustration of the segmentation of a sample application during processing in accordance with the invention.

FIG. 2 shows a high-level flowchart of a method for packaging a set of application files into a streamlet repository and FIG. 3 is an illustration of the segmentation of a sample application during processing in accordance with the invention. With reference to FIGS. 2 and 3, a software application that is installed on a computer system generally comprises one or more files, such as executable files, DLLs, data files, system initialization files, etc., which are placed in one or more specified folders. Initially, the files which are used by the installed application are identified and the file structure of the application is determined. (Steps 200, 202).

A sample application FOOBAR is illustrated in FIG. 3 as it is installed on a computer system. The application comprises a 100k executable file FOOBAR.EXE 300 and a 40k library file FOOBAR.DLL 502, both of which are stored in application folder FOOBAR. In addition, a data file DEFAULT.DAT 304 is also provided and stored in a DATA subfolder. The file structure 306 can be represented in tree format as shown. Although not shown, the application file structure can also include additional information about the files, such as a file size, version number or file date, write protect status, and other file-related meta-data.

Each of the application files are then divided into separate blocks. The division between blocks is made with reference to the manner in which the application file is likely to be read by the computer operating system when the client is executed. Preferably, the block sizes are each equal to a code page size used during file reads by an operating system expected to be present on a client system. For standard Microsoft Windows systems, files are generally read in four kilobytes blocks; the use of a block size equal to the operating system read size may be desirable. Since file system may load different types of files differently, it is possible for the block size to vary between different types of files and possibly even within different parts of a given file. However, in the implementation disclosed herein, the selected block size is constant within each file and across all files in the application. FIG. 3 shows the sample files divided into blocks 308, each of which is 4k in length. As will be appreciated, given a fixed block size, each block is uniquely associated with its source location with reference to the source file (e.g., a name and path) and an offset within that file.

After the application has been divided into blocks, each of the blocks is preferably compressed (step 206) and packaged into a streamlet repository along with a suitable access index (step 208). Various database or other random-access formats can be used for the repository such that each of the blocks can easily be individually extracted with reference to the index or in another manner. The streamlet repository is suitable for use in streaming the application from a server host to one or more clients, such as shown in FIG. 1.

This preprocessing permits the blocks from the application files to be stored in a file format or on a file system which differs from that the application is designed to run on. The streamlet repository can be used on a server which has a file system that is incompatible with the system on which the application will be executed. Particular streamlets can be extracted from the repository by the server (or another system) without concern for the contents of the application files or the manner in which the files are structured.

Further, because the streamlets are in a compressed format, server resources do not need to be expended in compressing the streamlets prior to transmission to a client. Although client resources are generally needed to decompress the streamlets, given the comparatively slow nature of communication links, such as dial-up modems, ISDN and DSL services, and wireless connections, the benefits of compressed data transmissions outweigh the added processing costs.

The streamlet repository can be combined with at least the application file structure information to form a preprocessed application package. This package can be easily distributed to streaming application servers and used by those servers to stream the application to suitable client users.

Some applications make changes to the overall computing environment when they are installed. Environmental changes include additions or modifications to registry file entries, control or initialization files (on computers using the Windows(™) operating system, these initialization files often have an ".ini" extension), file application mapping or bindings between different file types and associated applications, etc. In order for such an application to be streamed to a client and operate correctly, it may be necessary to make certain changes in the client's computing environment. Preferably, when such a streaming application is first started, the server sends appropriate environmental information to the client along with suitable software (if necessary) for the client to the environmental information and modify the client system appropriately. This environmental modification information can be included in an environmental install package which is generated during preprocessing of the application and bundled with the application package for distribution.

Figure 4:
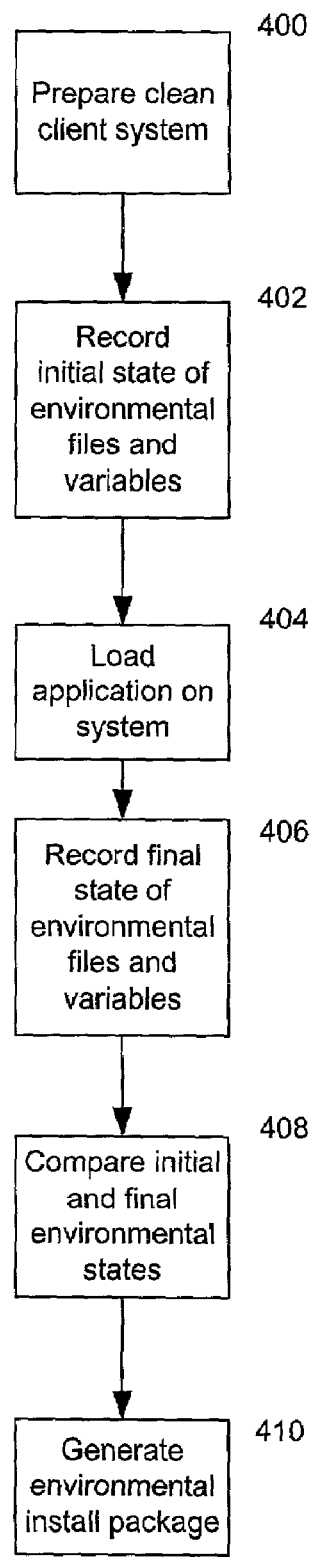
FIG. 4 is a high-level flowchart of a method for determining the environmental changes made to a computing platform when an application is installed.

FIG. 4 is a high-level flowchart of a method for determining the environmental changes made to a computing platform when an application is installed. Initially a client or model client system is prepared (step 400) and the initial state of the environmental settings is recorded (step 402). Next, the application is loaded onto the test system (step 404) and the final state of the environmental settings is recorded. (Step 406). The initial and final environmental states are then compared to identify the changes which were caused by installing the application. (Step 408) These changes are then recorded in a suitable format in one or more files which comprise the environmental install package for the application. For example, a single file or data object can be used within which, under different headings, are additions to the system registry, changes to specified control or ini files, etc. As will be appreciated, several different types of client systems may be used and respective environmental install packages generated for use in virtually installing a streaming application on that type of client system. The correct package to forward to a client can later be selected by the server.

Figure 5:
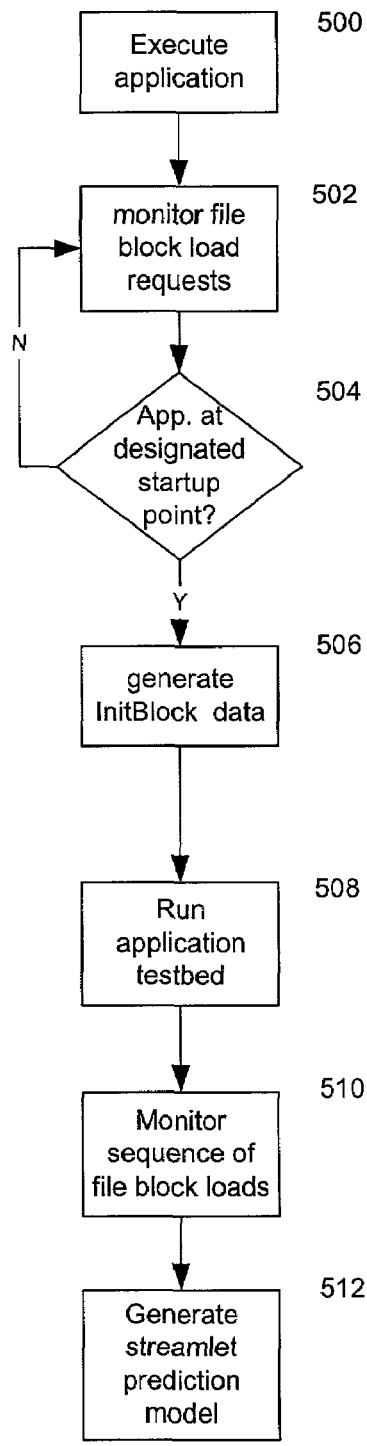
FIG. 5 is a high-level flowchart of a method for determining a startup streamlet set and generating a streaming prediction model for use in streaming the application.

According to yet a further aspect of the invention, and with reference to FIG. 5, the operation of the application itself, and particularly, the order in which the various blocks in the application files are loaded as the application is executed is monitored. (Steps 500–502). Various techniques to monitor or spy on operation system file load requests will be known to those of skill in the art and any suitable technique can be used. Monitoring continues until the application has reached a designated startup point, such as a pause where the application awaits user input. (Step 504) The identified blocks themselves or their identities can then be compiled into an initial or startup block definition (step 506) which is included in the application package. When the server begins streaming the application to a client, the "InitBlock" contents can be forwarded to the client first to ensure that when the application is executed, sufficient portions of it have been provided for execution to begin without immediately indicating that additional data is required from the server. The number of blocks included in the InitBlock will, typically, be determined by balancing the desire to provide responsive application performance once the user begins interacting with the application (this critiera implies a greater number of blocks in the InitBlock) and the desire to minimize the time needed to initialize the application and to begin interaction with the user (this criteria is implies a limited number of blocks so as to limit download delays).

In addition to monitoring the initial set of blocks loaded during individual application and during application suite execution, the application(s) can be executed on a suitable testbed and the overall sequence of block loads during execution monitored. (Steps 508–510). Various automated or manual testing scenarios can be performed and, preferably, all of the major application functions are executed. Monitoring may continue until the application has reached a designated startup point, such as where the application awaits user input (Step 504). Blocks may thereby be identified as belonging to the InitBlock Bundle of the application suite. When a client terminal connects to the server, the InitBlock Bundle can be the first content sent to the client to ensure that when application in the suite are executed, The data load information is analyzed, perhaps in conjunction with information indicating the specific program state during various loads, to generate one or more predictive models (step 512). These models can then be included as part of the application package to be used by a server. When streaming the application, the server can use the model to determine the order in which block or blocks are most likely to be loaded by the application when it is in a given state so that the streamlets most likely to be needed by the client executing the streaming application are sent to it first. The models are preferably provided in a format which can be modified by the server in accordance with the usage information and other information gathered during the streaming process itself.

Figure 6:
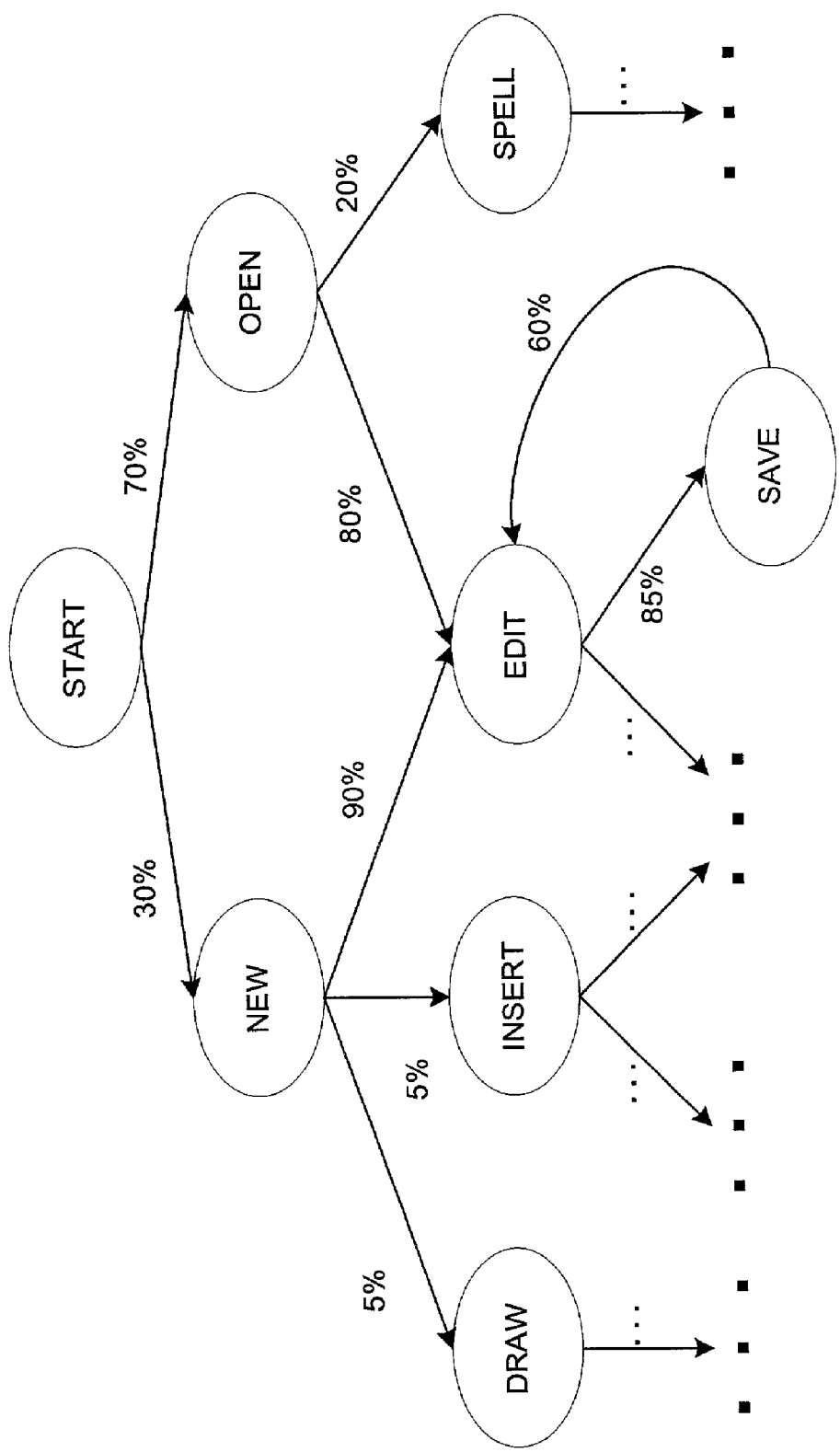
FIG. 6 is a sample usage graph representation of one form of a prediction model

Various statistical techniques can be used to analyze the sequence of loads generated by an operating system as it executes the application and generate a predictive model, and determine an optimal order to push the application streamlets to the client. In one embodiment, the predictive knowledge base can be viewed as a graph where a node is a user request or action (e.g. save, load) and an edge is the calculated probability that such a request will be made. Behind each node are specifications of the application blocks which are loaded by the application when the request is made. A simple example of such a graph is shown in FIG. 6. By examining the links flowing from a given node, the system can easily determine the most likely future requests and so determine the streamlets which will be needed by the application to execute those requests.

It is common for software users to access a suite of related programs when performing a task. For example, to prepare a document, a user may need to use a word processing program, a spreadsheet program, and a drawing program. Software manufacturers may respond to this type of usage pattern by grouping applications into suites. For example, the Microsoft Office(™) suite of programs contains a grouping of applications for performing common office tasks.

Application service providers (ASPs), and other providers of software downloaded on-demand, may also wish to group applications into suites of related programs. To improve the usability of such application suites, it is desirable that the switching time when moving between applications be minimal. That is, when a user switches from a first to a second application in an ASP's suite, it is desirable that the user interface of the second application appears with a minimal delay (even if functionality of that application is initially restricted). The ability to rapidly initialize applications as the user switches between them may improve the user's perception of the ASP's and application's performance.

In an ASP environment, rapid switching between applications may be obtained by packaging startup blocks (i.e., InitBlocks) of multiple applications (or portions of the InitBlocks) into a package of interrelated InitBlocks (an "InitBlock Bundle"). The InitBlock Bundle contains software blocks that perform basic initialization task for the suite of applications. These initialization tasks can include the presentation of a basic user interface to the user (thus allowing the user to rapidly perceive activation of the application). Preferably, after the InitBlock Bundle is received by the client computer, it will be stored in relatively permanent memory (e.g., hard disk storage, EEPROM, or other relatively permanent storage) so that it can both be re-used in the future and easily updated when necessary. Among the advantages that can be achieved by using InitBlock Bundles are the ability to launch and switch between applications faster, improved user perception of service speed, the ability to subscribe to a portion of applications represented in an InitBlock Bundle, rapid access to the other applications represented in the InitBlock upon subscription to those applications, improved usage profiling, and the ability to create new offerings based on user behavior.

After an InitBlock Bundle is received at a client terminal, a server may thereafter begin streaming of other blocks of the application suite. A predictive algorithm, such as the algorithm disclosed in co-pending U.S. patent application Ser. No. 09/120,575, entitled "Streaming Modules" and filed on Jul. 22, 1998, may be used. When a user accesses an application represented in an InitBlock Bundle, usage data 120 may be sent to the server 112 indicating the application being used. In some implementations, the server may thereafter stream that application's blocks to ensure rapid response of the application being used.

A server can determine the blocks needed in an InitBlock Bundle by monitoring an application loading process (see FIG. 5), by monitoring streaming request, or by explicit designation from a software developer. In some cases, two or more applications may use a common set of initialization blocks. For example, two applications may use common code to initialize toolbars and menus. The initialization blocks can be composed of executable or non-executable data, or a mix thereof. In some implementations, the InitBlock Bundle can include blocks for applications from different application service providers. This may be done where, for example, different application service providers have partnered to offer a set of services.

InitBlock Bundling may be determined, and/or service subscription offers made, based on usage data collected as a user is executing applications at the client computer. Usage data 120 can be sent to the server 112 indicating the applications and/or application features being accessed. This usage data may be stored and compared to a data in a statistical usage database 121 to determine application marketing opportunities. For example, based on the usage data 120 and the statistical usage data 121, the system may determine that a particular application that the user does not subscribe to has features that are likely to be of interest to the user. In response, the system 112 may send data to the user's terminal causing a pop-up window or other display indication to appear. The display indication can contain marketing and subscription information offering the unsubscribed application to the user. The user may be able to click on the pop-up window to subscribe to the offered application (e.g., by clicking on an "Accept Offer" button or completing a subscription form). If the user decides to subscribe to the application, the server may respond by sending access control data to the client terminal enabling access to the unsubscribed application. For example, a decryption key may be sent.

Some example scenarios of InitBlock Bundle usage will now be described. In the following scenarios, three exemplary application service providers (ASP1, ASP2, and ASP3) are considered. ASP1 offers applications S1, S2, S3, S4 and has a user base consisting of subscribers U1, U2, U3. ASP2 offers applications S1, S2, S5, S6, S7 and has a user base consisting of subscribers U4, U5, U6, U7. ASP3 offers applications S2, S3, S6, S8, S9 and has a user base of U8, U9, U10, U11, and U12.

In scenario 1, Users U8, U9, U10 each subscribe to applications S2, S3, S6 offered by ASP3. Each of these users receives an InitBlock Bundle that includes the InitBlocks of applications S2, S3, and S6. In addition, the InitBlock Bundle sent to U8, U9, and U10 includes InitBlocks for other (currently unsubscribed) services S8 and S9 available from ASP3. User's U8, U9, and U10 will, therefore, be able to rapidly start any of applications S2, S3, S6. In addition, if the users later subscribe to S8 or S9, these services can be rapidly accessed using the InitBlock information previously sent in the InitBlock Bundle.

In scenario 2, users U8, U9, U10 each subscribe to applications S2, S3, S6 of ASP3. Usage statistics data 121 indicates that 80% of users of applications S2 and S3 will respond favorably to an offer for application S5. Application S5 is unavailable from ASP3, but may be obtained from ASP2. To offer S5 to its subscribers, ASP3 may partner with ASP2 and include the S5 InitBlock in the InitBlock Bundle sent from ASP3. Usage data 120 collected at ASP3 may be used to account to ASP2 for usage of S5. In some cases, ASP3's server system may provide only the S5 InitBlock to the user's client computer. Remaining blocks of S5 may be obtained from a second server system under control of ASP2. To support this division of applications across different server systems, the InitBlock may include additional data pointing to the appropriate server system. Alternatively, control data may flow between server systems operated by ASP2 and ASP3 to control and synchronize the streaming of additional blocks of S5. A second alternative is for ASP3 and ASP2 to partner such that both sets of applications are offered to all customers. Thus, an InitBlock Bundle offered by this partnership including InitBlock data for applications S1, S2, S3, S4, S5, S6, and S7.

In scenario 3, a virtual aggregate ASP (ASP123) is created and monitors the usage of all applications served by ASP1, ASP2, and ASP3. ASP123 monitors the usage data 120 generated by all of the ASPs and dynamically updates InitBlock Bundles using the sets of InitBlock Bundles from the ASPs. ASP 123 can access the usage database 121 and usage data 120 to form different InitBlock Bundles targeted to different users or groups. Thus, a continuously customized collection of InitBlock Bundles may be created and distributed.

In cases in which multiple ASPs partner to offer services, usage data 120 can be monitored to determine appropriate revenue accounting arrangements. In addition, the usage data 120 can be used to offer new pricing models, such as dynamic pricing (i.e., time-sensitive pricing) or per-feature pricing. Additionally, it can be used to create an integrated billing and software distribution system based on the behavior of users.

Applications developers commonly re-use program code and libraries among multiple applications. For example, application suites may share code to render a common look-and-feel of window, toolbar, and menu structures. As a result, different applications may embody common blocks of code. In many cases, this is true even for applications from different software vendors (for example, different vendors may each use the same library of code provided by the same third-party vendor). Download delays can be limited by providing a mechanism for sharing (i.e., reusing) common code blocks among different applications, including applications from different vendors. Advantageously, such a mechanism can operate even in the absence of an application developer's knowledge of this common code usage because the application itself knows what it needs. The ability to re-use common code blocks can help to minimize the size of InitBlocks and InitBlock bundles.

Reuse of streamed blocks can be by enabled using a unique identifier exchanged between the streaming server and client. This unique identifier can be used to determine if the client already has a stored copy of a particular code block, or if the client needs the block of code to be sent. The client, upon receiving the unique identifier, can compare it to identifiers of already-received blocks. If the client determines that a needed block is already present at the client, the client can re-use the stored block (e.g., by copying it to a needed location). If the needed block is not present at the client, control data can be sent back to the server to cause the block to be streamed to the client.

A unique hash key may be used as an identifier of each of the blocks streamed from the server to the client. A block's hash key can be, e.g., a 32-bit, 64-bit, or 128-bit value generated by processing each byte of a block using a hash algorithm. Many different hash algorithms can be used (e.g., digital signature algorithms, on-way hash algorithms, etc.). The hash algorithm and hash key size are preferably selected such that the hash key size is substantially smaller than the block size and, for any two different start blocks, two different hash keys will be produced. It is recognized that practical hash algorithms and key sizes will likely have some probability of producing the same hash key for different code blocks. If this occurs, execution errors may result; however, appropriate hash algorithm and key size selection can reduce this event to a statistically insignificant probability.

Figure 7:
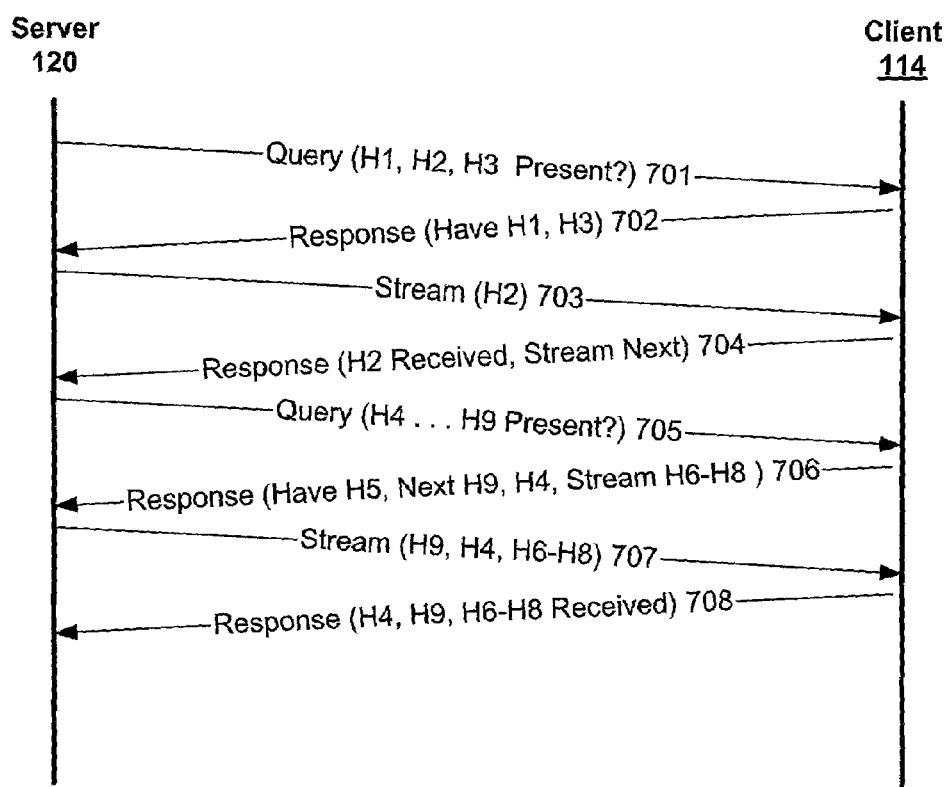
FIG. 7 illustrates a process that may be used by a streaming server to determine a set of code blocks needed to execute an application at the client computer.

FIG. 7 illustrates a process that may be used by a streaming server to determine a set of code blocks needed to execute an application at the client computer. The process may begin with a message 701 from a server 112 containing unique identifiers (i.e., hash values H1–H3) of a set of code blocks. For example, the nine 4K blocks of the "foobar.dll" file 302 (FIG. 3) may be uniquely identified by nine 64-bit hash values (one per 4K block). The message 701 may include all or a subset of these has values; as shown message 701 includes three of the hash values (H1–H3). Upon receiving the message 701, the client computer may query a local database or table containing the hash values of all (or a subset of all) code blocks stored at the client. Based on this query, the client can determine the needed blocks and responds 702 by identifying which of the blocks H1–H3 are stored at the client (e.g., H1 and H3 in message 702). Conversely, the message 702 may indicate the needed blocks. In some cases, the client 702 may "find" blocks H1, H2 in unrelated code (i.e., code previously received for unrelated applications).

After receiving message 702, the streaming server processes the received data to determine a streaming order for those blocks identified in message 701 that are not located at the client. The server may then begin the streaming of the needed block(s) 703 (i.e., block H2). In some implementations, additional blocks not identified in message 701 may also be streamed. After the block(s) have been received by the client 704, the server may again query the client 705. In some cases, the client can respond by indicating the desired streaming order of blocks. For example, the message 706 Indicates that the client already has a copy of the block identified by hash key H5, that the next blocks needed at the client is block H9 followed by H4. In response the server sends blocks H9 followed by H2 and then selects a streaming order for blocks H6–H8. In some implementations, the server may send control data to the client identifying a particular file by file-name or other conventional file identifier. The use of identification keys to determine needed blocks may be used for blocks in InitBlock Bundles, as well as for other blocks. Prior to sending an InitBlock bundle, the server can send key values to the client to determine whether particular blocks in the InitBlock Bundle are present at the client. If so, these blocks may be omitted from the InitBlock Bundle. When the InitBlock Bundle is transmitted to the client, data can be included in the InitBlock bundle (e.g., the key value and/or other control data) to indicate that the client terminal should reconstruct the full InitBlock Bundle by adding to it the already-stored blocks identified by the key values.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method of transmitting executable software from a server to a client computer, the method comprising:
   segmenting each of a plurality of software applications into a collection of executable blocks, to form a plurality of collections of executable blocks;
   forming a startup block bundle comprising blocks executable during initialization of the plurality of software applications, at least one executable block from each of the plurality of software applications being included in the startup block bundle;
   sending the startup block bundle to a client computer to enable the client computer to execute the plurality of software applications in a streaming mode; and
   sending other blocks from the plurality of collections of executable blocks to the client computer subsequent to a start of execution of the startup block bundle.

2. The method of claim 1 wherein:
   the plurality of software applications comprise at least one software application subscribed to by a user and at least one software application not subscribed to by the user; and
   the method further comprises:
   monitoring execution of software applications subscribed to by the user to determine a software application usage pattern; and
   based on the usage pattern, sending data to the client computer to display information about a first one of the software applications not subscribed to by the user.

3. The method of claim 2 wherein:
   the data to display information about a first one of the software applications not subscribed to by the user comprises an offer to subscribe to the first one of the software applications not subscribed to by the user.

4. The method of claim 3 further comprising:
   in response to the offer to subscribe, receiving data at the server indicating acceptance of the offer; and
   sending data to the client computer to enable execution of the first one of the software applications not subscribed to by the user.

5. The method of claim 4 wherein:
   the startup block bundle comprises access control data; and
   sending data to enable execution comprises sending changed access control data from the server to the client computer.

6. The method of claim 5 wherein sending the changed access control data comprises automatically sending in response to a subscription request received at the server from the client computer.

7. The method of claim 5 wherein the access control data comprises an encryption key enabling access to blocks of subscribed to software applications.

8. The method of claim 1 further comprising:
   from each of a plurality of service providers, sending to a client terminal a startup block bundle comprising a plurality of initialization blocks;
   monitoring execution of blocks in each of said startup block bundles to determine a usage pattern; and
   forming a new startup block bundle based on the usage pattern.

9. The method of claim 8 wherein the new startup block bundle comprises executable blocks associated with software applications from different ones of the service providers.

10. The method of claim 1 wherein at least one of the blocks in the startup block bundle is a shared block executable during the initialization phase of different ones of the software applications.

11. The method of claim 1 wherein the startup block bundle comprises, for each of the plurality of software applications, a set of blocks sufficient to enable execution of said software application to a point when said software application awaits user input.

12. The method of claim 1 wherein forming the startup block bundle comprises: monitoring usage of a plurality of different software applications; and wherein forming the initialization block comprises forming based on the monitored usage.

13. The method of claim 1 further comprising:
   sending from the server to the client computer a plurality of key values, the key values identifying ones of the collection of executable blocks;
   receiving a response at the server from the client computer indicating blocks identified by the key values that are already stored at the client computer; and wherein
   sending the startup block bundle comprises omitting blocks stored already stored at the client computer.

14. A computer system comprising:
   a database storing a plurality of software applications segmented into a plurality of executable code blocks, each said software application's plurality of executable code blocks comprising a set of executable initialization code blocks;
   a processor operatively coupled to the database; and a computer readable data storage medium comprising instructions to configure the processor to:
   form an initialization block comprising executable initialization code blocks from each of the plurality of software applications; and
   send the initialization block to a client computer via a network to enable the client computer to execute the plurality of software applications in a streaming mode.

15. The system of claim 14 wherein the data storage medium further comprises instructions to configure the processor to:
   monitor execution of initialization code blocks at the client computer to determine a usage pattern; and
   form a new initialization block based on the usage pattern.

16. The system of claim 14 wherein:
   the system further comprises a database containing a plurality of user profiles, each user profile comprising security data to control usage of ones of the plurality of software applications by a respective user; and
   the data storage medium further comprises instructions to configure the processor to:
   query the database of user profiles to access security data associated with a first user;
   process the security data to determine application restriction data associated with the first user; and
   send the application restriction data to the client computer.

17. The system of claim 16 wherein the application restriction data comprises further comprises data preventing user access to a software application not subscribed to by the first user.

18. An apparatus comprising:

means for segmenting each of a plurality of software applications into a collection of executable blocks, to form a plurality of collections of executable blocks;

means for forming a startup block bundle comprising blocks executable during initialization of the plurality of software applications, at least one executable block from each of the plurality of software applications being included in the startup block bundle;

means for sending the startup block bundle to a client computer to enable the client computer to execute the plurality of software applications in a streaming mode; and means for sending other blocks from the plurality of collections of executable blocks to the client computer subsequent to a start of execution of the startup block bundle.

* * * * *